United States Patent [19]

Hall

[11] Patent Number: 4,901,630
[45] Date of Patent: Feb. 20, 1990

[54] DUAL CHAMBERED BEVERAGE BREWING SYSTEM

[76] Inventor: Mitchell B. Hall, 7104-R Brandemere Ln., Winston-Salem, N.C. 27106

[21] Appl. No.: 215,315

[22] Filed: Jul. 5, 1988

[51] Int. Cl.$^4$ .......................... A47J 31/00; A47J 31/06
[52] U.S. Cl. ......................................... 99/295; 99/300; 215/6
[58] Field of Search ................ 99/279, 306, 295, 305, 99/300, 322, 290, 280; 426/433; 215/6

[56] References Cited

U.S. PATENT DOCUMENTS

| | | | |
|---|---|---|---|
| 3,220,334 | 11/1965 | Martin | 99/304 |
| 3,590,724 | 7/1971 | Lorang | 99/290 |
| 3,628,446 | 12/1971 | Raiteri | 99/290 |
| 3,908,530 | 9/1975 | Simon | 99/322 |
| 4,167,136 | 9/1979 | Chupurdy | 99/306 |
| 4,309,939 | 1/1982 | Stover | 99/280 |
| 4,603,620 | 8/1986 | Daugherty | 99/300 |
| 4,651,900 | 3/1987 | Horvath | 215/6 |
| 4,802,406 | 2/1989 | Bouldin | 99/295 |

*Primary Examiner*—Robert W. Jenkins

[57] ABSTRACT

This invention provides a beverage brewing apparatus having a water containing lid which divides a flow of heated water into two measured portions. This lid enables collection of heated water from various sources including an electric drip coffee maker, and is removably supported by a brewing container having two interior chambers. The two brewing chambers are separated by an upright partition and each chamber has holes for draining liquids. The brewing container is removably supported by a pot having two interior chambers, a pouring spout for each chamber, a lid covering both chambers and a pivoting handle. A seal is created between the brewing container and the pot upon which it is situated, preventing leakage and intermixing. Two separate brewing substances deposited in each chamber of the brewing container become saturated by measured portions of heated water, brewing both simultaneously. Resulting beverages drip into the two chambered pot where they can be warmed and poured while sealed from leakage or intermixing. Tea can be brewed by direct introduction of a tea bag into one of the pot's two chambers.

4 Claims, 2 Drawing Sheets

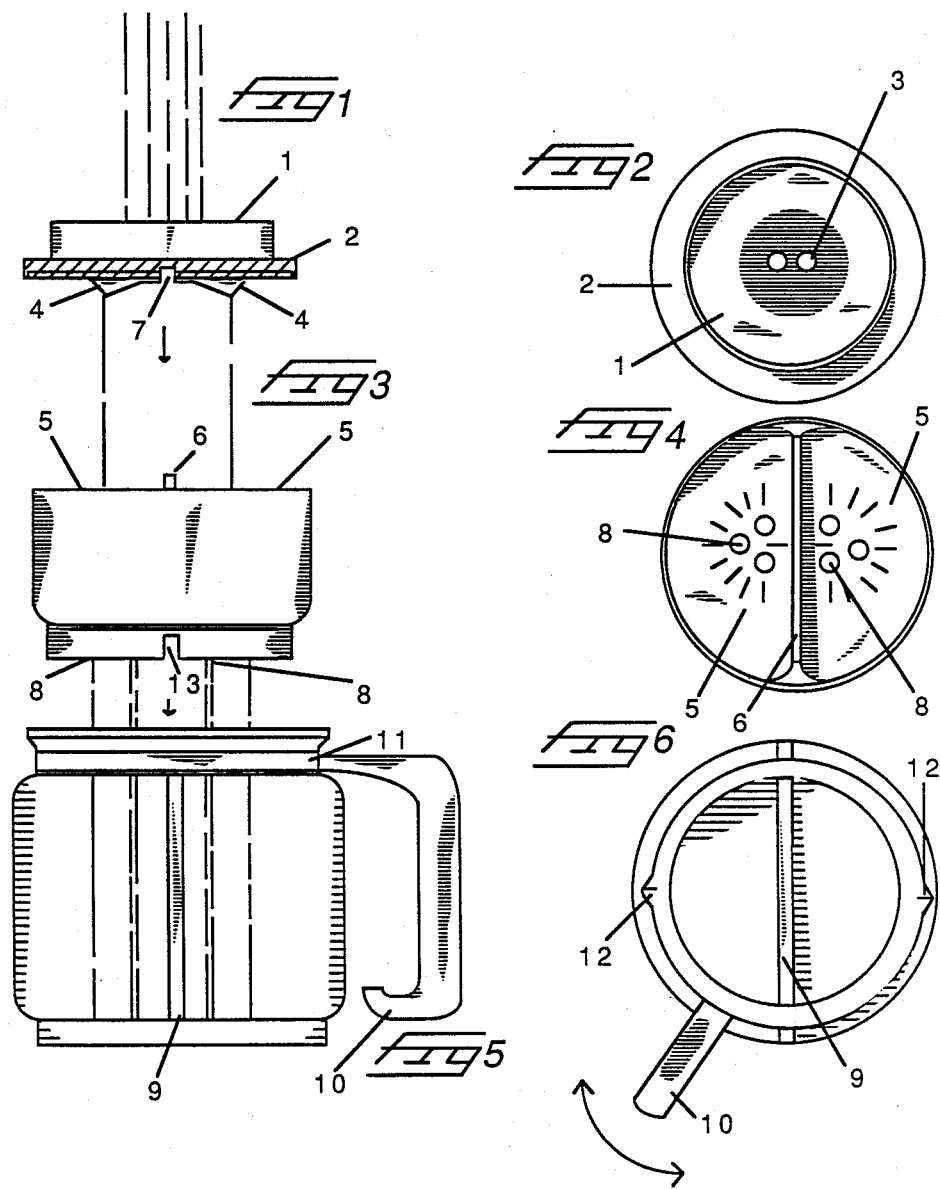

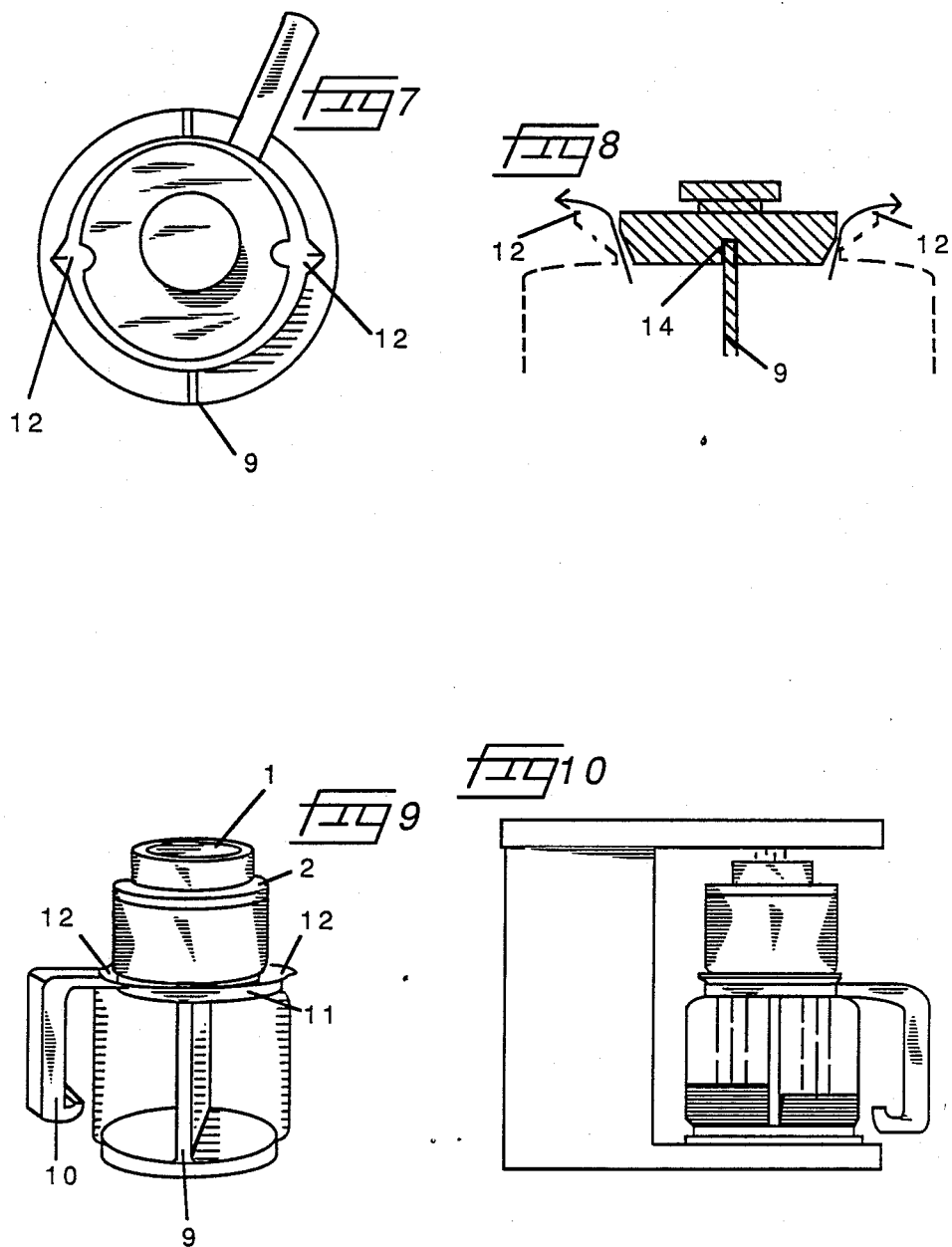

DUAL CHAMBERED BEVERAGE BREWING SYSTEM

BACKGROUND OF THE INVENTION

Electric drip, pour over type coffee makers, of the type disclosed in U.S. Pat. No. 3,220,334 have been available for household use for over twenty years. This type appliance was created as a convenient and fast means of brewing a high quality coffee beverage and has grown to become the most popular type of coffee making device sold in the United States. This type of coffee maker is capable of only making one beverage during each brewing process.

The invention described herein is a useful device that when used in conjunction with this type of coffee maker, or any device which produces water hot enough for brewing, can brew and maintain warmth in two beverages simultaneously, thereby saving considerable amounts of time and energy. Prior art devices such as U.S. Pat. Nos. 4,603,620 & 3,590,724 disclose a means of producing a coffee beverage along with a means for dispensing hot water, but neither device could be used for simultaneously producing two brewed beverages from a single undifferentiated flow of water, such a that resulting from the operation of a household electric drip type coffee maker. The invention disclosed herein not only provides a means for brewing two beverages simultaneously, but also a means for warming and pouring both beverages using a solitary container. U.S. Pat. No. 3,628,446 discloses a means for brewing coffee and tea. This device varies from the device I have disclosed herein in that U.S. Pat. No. 3,628,446 can not brew two coffee beverages simultaneously, such as caffinated and de-caffinate coffee, and it does not brew both the coffee and tea simultaneously, rather the coffee first then the tea. Other patent disclosures, such as U.S. Pat. No. 3,908,530 indicate a device with a brewing chamber positioned on top of a coffee storage pot, but this device can only brew one beverage during the brewing process.

PURPOSE OF THE INVENTION

The primary object of the disclosed invention is to provide a device useful in brewing two separate beverages simultaneously, using a single flow of heated water, and a solitary pot for collecting, segregating, warming and pouring two separate beverages. For busy families this system reduces by one half the time required to brew two beverages. Because there is an increasing awareness regarding the health problems associated with caffine, many families are split between persons wanting decaffinated coffee, and those preferring regular caffinated coffee. Generally all family members require the beverages at the same time.

A further object of this invention is to provide a means for brewing two beverages simultaneously, using, but not limited to, a conventional electric drip, pour over type coffee maker, since this is the most popular type of coffee making appliance currently found in American homes.

Another object of this invention is to provide a simple means for brewing a half or full pot of beverage, as desired, without wasting brewing substance.

SUMMARY OF THE INVENTION

The invention as described herein comprises a device as means of collecting a solitary flow of heated water, from a conventional coffee maker or other source, dividing it into two equal portions, and distributing said water into two segregated chambers for the brewing of two substances simultaneously. The brewed substances subsequently drip into a two chambered storage pot which has an impenetrable upright partition providing a means of collecting, segregating, warming and pouring the two separately brewed beverages. A pivoting handle provides a means for grasping the two chambered storage pot while pouring the beverages from either chamber. A lid, which covers one chamber of the two chambered pot, while allowing the contents of the second chamber to be poured, and vice-versa, provides a means for preventing leakage from either chamber of said storage pot during pouring.

BRIEF DESCRIPTION OF DRAWINGS

FIG. 1 Side view of bi-directional water distributor device and integral brewing chamber lid FIG. 2 Top view of bi-directional water distributor device and integral brewing chamber lid FIG. 3 Side view of two chambered brewing container FIG. 4 Top view of two chambered brewing container FIG. 5 Side view of two chambered storage pot FIG. 6 Top view of two chambered storage pot FIG. 7 Top view of reversible pouring lid FIG. 8 Side cross sectional view of reversible pouring lid FIG. 9 perspective operational view FIG. 10 side view in use with conventional coffee maker

DESCRIPTION OF PREFERRED EMBODIMENTS

More specifically, referring to the drawings, the bi-directional water distributing device (1) is the point at which a stream of heated water enters the brewing system. This device, enabling correct alignment of said water distributor with two brewing chambers situated below is constructed of plastic or other moldable substance, in the shape of a container. Said container is formed as an integral part of the brewing chamber lid (2) which together form the bi-directional water distributor/lid device FIGS. 1 & 2. The bi-directional water distributing device collects a stream of heated water, allowing said water to drain through two holes (3) at the bottom of said distributor device. The bottom of the bi-direction water distributor is slightly concaved with said two holes in the center, which funnels the water toward the drainage holes. The two holes drain water into two diverter channels (4) which protrude from beneath the bi-directional water distributor/lid device, channeling two equal portions of water in divergent directions, toward the centers of the two brewing chambers (5). When in operation, the bi-directional water distributor/lid device rests on top of the two chambered brewing container FIGS. 3 & 4 with the brewing chamber divider (6) protruding into, and filling the indentation (7) in the bottom of the bi-directional water distributor/lid device. Said distributor/lid structure is removed when filling the chambers with brewing substance. The two chambered brewing container is also constructed of plastic or other moldable material. The two chambered brewing container holds a disposable filter and the substance to be brewed in either or both brewing chambers. After the hot water from the bi-directional water distributor device above, saturates and causes the brewing substance present in the two chambers to be brewed, the brewed beverages drip through the hole(s) (8) in the bottom of each chamber, into the two chambered storage pot FIGS. 5 & 6 situated below said brewing chambers. The bottom of both brewing chambers are slightly concaved to funnel liquid toward the drain holes. The two chambered brewing container can be positioned either directly on top of, resting thereon, the two chambered storage pot, as shown, FIGS. 9 & 10 or can be affixed beneath the hot water outlet of a conventional electric drip coffee maker, being suspended above the two chambered storage pot. The two chambered brewing container can be kept in place on top of said storage pot, during pouring, or removed. Said two chambered storage pot has an upright impenetrable partition (9) as an integral member of said storage pot, of like material, which formed as part of the molding process during manufacture. Said partition traverses the diameter of said storage pot, dividing the pot into two equal chambers. The two chambered pot is constructed of either glass, plastic, metal or ceramics depending on the durability required. Glass is possibly the most serviceable material for the construction of said storage pot in most domestic applications. Two separate brewed beverages, from the above two chambered brewing container, drip into each respective chamber of said storage pot, where each beverage is stored and warmed while kept totally segregated. Labels are present on the outside of either chamber of said storage pot indicating the type of beverage present in each chamber. Tea is most easily brewed by omitting a disposable filter from one of the brewing chambers, and placing a tea bag in the corresponding chamber of the two chambered storage pot. The two chambered storage pot employs a pivoting handle (10), for grasping the storage pot while pouring. Said pivoting handle is fastened to a metallic band (11) having a circumference which is fractionally larger than the circumference of the two chambered storage pot's neck, and forms around the circumference of said storage pot neck. This fractional tolerance difference allows said handle to pivot three hundred and sixty degrees around the neck of the two chambered storage pot. This pivoting capability allows the handle to be positioned opposite the side from which the beverage is to be poured, to facilitate pouring of beverage from either chamber. The upward pressure of the pouring motion and close tolerance of the pivoting handle's neck band relative to the circumference of the two chambered storage pot's neck, prevent the handle from sliding laterally during pouring. The two chambered storage pot has two spouts (12) one for each chamber, allowing a beverage to be poured from either chamber. The two chambered storage pot can be covered by a reversible lid, constructed of plastic or other moldable substance, FIGS. 7 & 8 which allows the contents of one chamber to be poured while containing the contents of the second chamber, and vice-versa. The bottom side of both the reversible lid (14) and the two chambered brewing container (13) having sealing indentations which traverse the diameter of both devices. Said sealing indentations conform exactly to the contour of the two chambered storage pot's impenetrable upright partition, creating a seal which prevents the intermixing of the two beverages when using either the two chambered brewing container or the reversible lid.

What I claim as new is:

1. A beverage brewing apparatus, operable with potable water from any source producing water sufficiently hot for brewing, enabling the brewing of two beverages simultaneously, said apparatus comprising:
    (a) a water regulating means controllably dividing a flow of heated water into at least two measured portions,
    (b) a means operable for containing two brewing substances and two portions of heated water enabling the separate brewing of two beverages,
    (c) a collecting means enabling containment of two beverages.

2. A regulating means, as described in claim 1, wherein:
    (a) a means enabling collection of heated water from variable sources,
    (b) means containing water,
    (c) means controllably draining two equal portions of said water through the bottom of said regulating means,
    (d) means directing said portions of water toward each of two brewing substances,
    (e) means of support provided by a containing means, whereby said regulating means is structurally independent of a water supply,
    (f) means enabling correct alignment between said regulating means and a containing means.

3. A containing means, as described in claim 1, wherein:
    (a) means of support provided by a collecting means,
    (b) partition means dividing said containing means into two chambers enabling the simultaneous brewing of two separate substances,
    (c) means draining liquids from each chamber,
    (d) sealing means conforming to an aperture and upright partition of a collecting means, preventing leakage and intermixing of two beverages during ingress, and egress from said collecting means, said sealing means additionally enabling correct alignment between corresponding chambers of said containing and collecting means.

4. A collecting means, as described in claim 1, wherein:
    (a) a singular means having two interior chambers,
    (b) partition means dividing said collecting means enabling separation of two beverages therein,
    (c) aperture means enabling ingress, and egress of beverages from said collecting means,
    (d) sealing means placed over said aperture, conforming to an upright partition and interior walls of said collecting means, preventing leakage and intermixing while pouring beverages from either chamber of said collecting means,
    (e) grasping means enabling the pouring of beverages from either chamber of said collecting means,
    (f) channeling means enabling restricted egress of beverages from either chamber of said collecting means during pouring,
    (g) means enabling introduction of tea into said collecting means,
    (h) means operable with heated water, brewing formentioned tea.

* * * * *